United States Patent [19]

Chen

[11] Patent Number: 5,684,837
[45] Date of Patent: Nov. 4, 1997

[54] ADJUSTABLE DIGITAL FSK DEMODULATOR

[75] Inventor: Chang-San Chen, Taipei, Taiwan

[73] Assignee: United Microelectronics Corporation, Hsin-Chu, Taiwan

[21] Appl. No.: 611,539

[22] Filed: Mar. 6, 1996

[51] Int. Cl.[6] .................... H03D 3/00; H04L 27/14
[52] U.S. Cl. ............................ 375/334; 329/303
[58] Field of Search ...................... 329/303, 300; 375/334, 223, 328, 324, 272, 340

[56] References Cited

U.S. PATENT DOCUMENTS

| | | | |
|---|---|---|---|
| 3,979,685 | 9/1976 | Motley et al. | 375/324 |
| 4,551,846 | 11/1985 | Takeda et al. | 375/328 |
| 4,616,187 | 10/1986 | Watanabe | 375/334 |
| 5,533,061 | 7/1996 | Smith et al. | 375/334 |

Primary Examiner—Stephen Chin
Assistant Examiner—Betsy Lee Deppe
Attorney, Agent, or Firm—Meltzer, Lippe, Goldstein, Wolf and Schlissel, P.C.

[57] ABSTRACT

An apparatus and method for demodulating a frequency-shift keyed (FSK) signal to provide a data signal. An input FSK signal is processed in a waveform reshaper to generate a first pulse signal which includes a pulse for each cycle of the FSK signal. The first pulse signal is processed in a cycle counter to generate second and third pulse signals. The second pulse signal includes a pulse for each time a low clock pulse count is reached between pulses of the first pulse signal, and the third pulse signal includes a pulse for each time a high clock pulse count is reached between pulses of the first pulse signal. The low and high pulse counts are generally indicative of cycles of first and second FSK carrier frequencies, respectively, in the input FSK signal. The second pulse signal is processed in a data recognizer to generate a logic level indicator signal. The indicator signal counts pulses of the second pulse signal to thereby provide an indication of the presence of a particular logic level in the FSK input signal. The third pulse signal and logic level indicator signal are processed in a data generator to provide the demodulated data signal. An FSK demodulator in accordance with the invention can be implemented entirely in digital circuitry. The cycle counter and data recognizer can be readily adjusted to accommodate a variety of different FSK protocols.

18 Claims, 6 Drawing Sheets

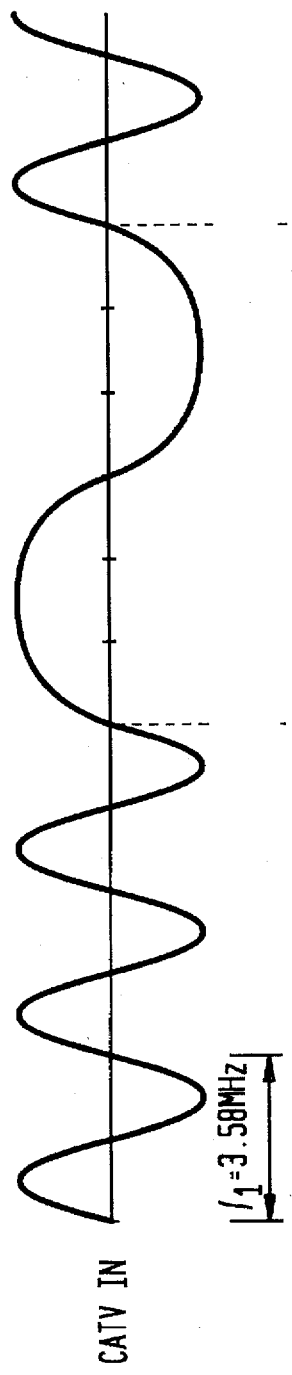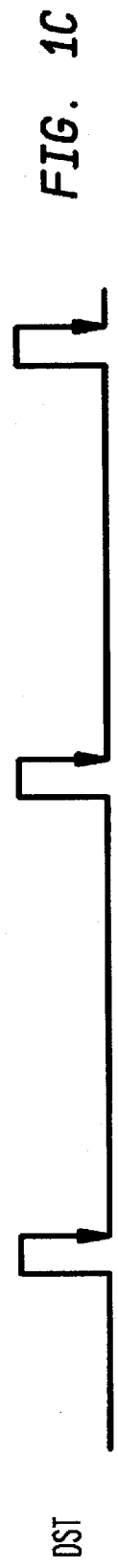

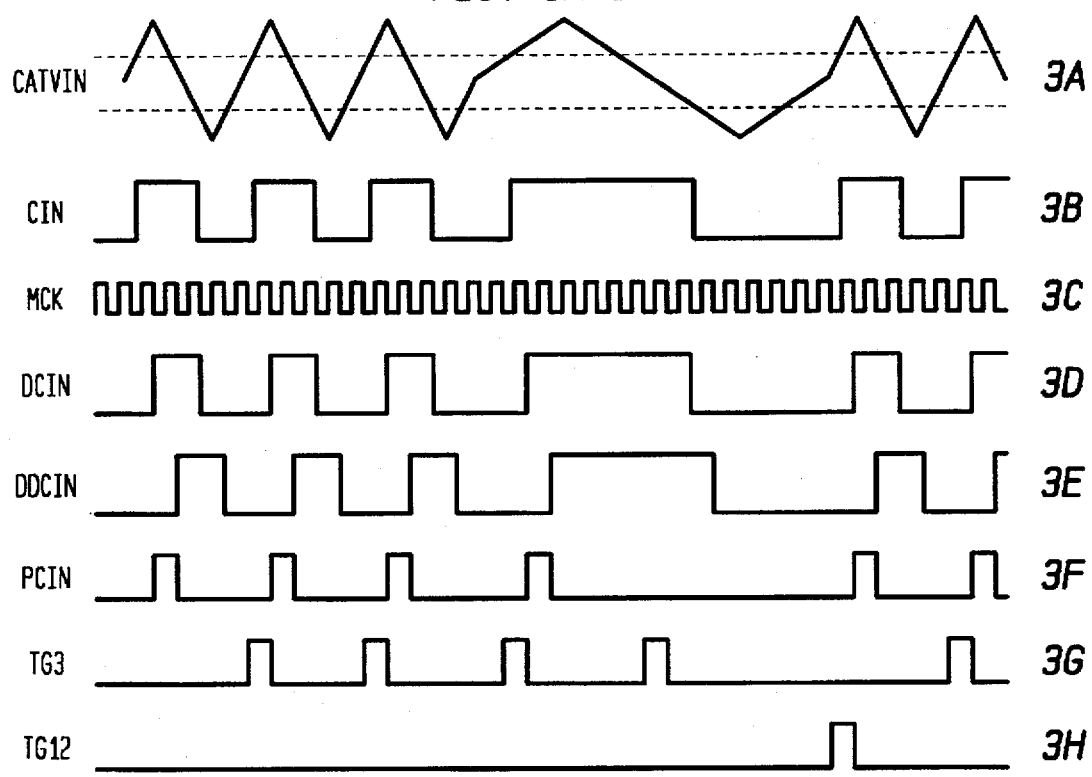
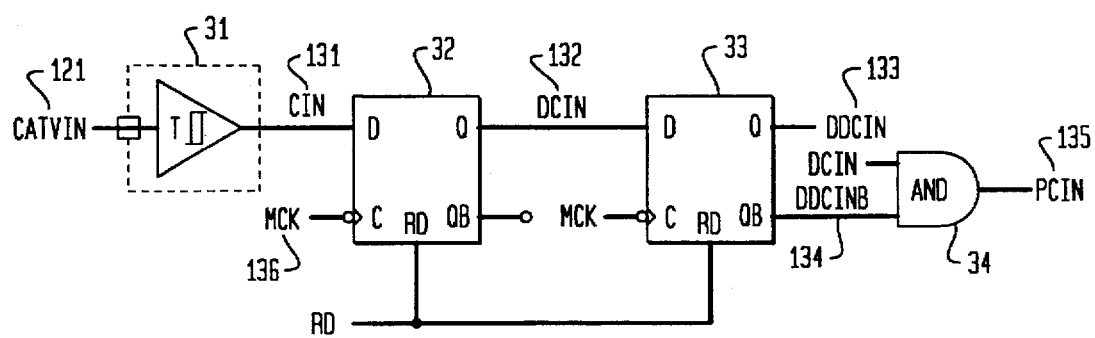

10.7386×2 = 21.4772

/3.58 = 5.999    1.78-4.29 MHz

/2.38 = 9.024

/1.19 = 18.048    0.82-1.65 MHz

*f1: 3.58MHz
*f0: 1.19MHz

ADJUSTABLE DIGITAL FSK DEMODULATOR

FIELD OF THE INVENTION

The present invention relates to demodulation of frequency shift keyed (FSK) signals and more particularly to a digital FSK demodulator with adjustable detection characteristics.

BACKGROUND OF THE INVENTION

Conventional frequency shift keyed (FSK) demodulators typically utilize analog circuitry such as a phase lock loop (PLL) in the demodulation process. The analog circuitry is generally designed for optimal detection of a predetermined set of carrier frequencies representing high and low binary logic levels in a stream of data to be transmitted. A significant problem with such conventional FSK demodulators is the cost and complexity associated with the PLL and other analog circuitry. Another problem is that the analog circuitry is generally very inflexible. For example, a user typically cannot adjust the demodulator characteristics in order to accommodate different carrier frequencies. A single conventional FSK demodulator is therefore generally not suitable for use with a variety of different types of FSK systems and protocols.

It would be highly desirable in many communication applications to have the ability to adjust the demodulator communication protocol in accordance with the needs of a particular user. This ability would facilitate the development of new communication products, services and systems in many different applications. For example, community access television (CATV) or other cable-based signal delivery systems could readily implement a variety of new signal delivery services which make use of several different FSK frequency sets. As noted above, conventional FSK demodulation could require separate analog circuitry for each set of FSK frequencies. The resulting equipment cost and complexity may therefore unduly limit implementation of the new products, services and systems. An adjustable FSK demodulator could also accommodate protocol variations dictated by the properties of various types of cables or other transmission media so that it would be unnecessary to design different demodulation products for different cable properties. Again, conventional FSK demodulators based on analog detection circuitry are generally unable to provide these desirable features.

As is apparent from the above, a need exists for an adjustable FSK demodulator that can be implemented entirely in digital circuitry and that can provide the flexibility to accommodate a variety of different input signal frequencies and/or protocols.

SUMMARY OF THE INVENTION

The present invention provides an adjustable FSK demodulator which does not require a phase lock loop (PLL) or other analog circuitry. The demodulator may be implemented entirely in digital circuitry and is therefore generally less complicated and less expensive relative to conventional FSK demodulators which utilize analog circuitry for signal detection. The demodulator is adjustable and suitable for use with a wide variety of FSK protocols and in numerous communication applications.e In accordance with one embodiment of the invention, an input FSK signal is processed in a waveform reshaper to generate a first pulse signal which includes a pulse for each cycle of the FSK signal. The first pulse signal is processed in a cycle counter to generate second and third pulse signals. The second pulse signal includes a pulse for each time a low clock pulse count is reached between pulses of the first pulse signal, and the third pulse signal includes a pulse for each time a high clock pulse count is reached between pulses of the first pulse signal. The low and high counts are generally indicative of cycles of first and second FSK carrier frequencies, respectively, cycles in the input FSK signal. The second pulse signal is processed in a data recognizer to generate a logic level indicator signal. The indicator signal counts pulses of the second pulse signal to thereby provide an indication of the presence of a particular logic level in the FSK input signal. The third pulse signal and logic level indicator signal are processed in a data generator to provide the demodulated data signal. The pulses of the first, second and third pulse signals may have a pulsewidth corresponding to a system time clock period, and the low and high clock pulse counts may be based on counts of system clock pulses. The third pulse signal and the logic level indicator may be processed in a data strobe signal generator to generate a data strobe signal indicative of a time after a transition in the data signal at which the data signal can be sampled.

An important feature of the invention is that the cycle counter and/or data recognizer can be readily adjusted to accommodate a variety of different FSK protocols. For example, an adjustment signal may be applied to the cycle counter to adjust the low pulse count, the high pulse count or both, and another adjustment signal may be applied to the data recognizer to adjust the number of second pulse signal pulses required to indicate a logic level in the FSK input signal. The cycle counter can thereby be made to count a different number of system clock cycles before a pulse is generated in the second or third pulse signals, and the data recognizer can be made to indicate the presence of a logic one or logic zero bit after a different number of input FSK signal frequency cycles. The use of digital circuitry allows these and other adjustments to be made quickly and easily. Another important feature of the FSK demodulator of the present invention is that when the system clock frequency is changed, demodulator parameters which are based on counting clock pulses, such as the low and high clock pulse counts, need not be readjusted.

An all-digital adjustable FSK demodulator in accordance with the present invention provides numerous advantages over conventional analog FSK demodulators. The digital design provides simplified circuitry, highly reliable performance and easy integration with other circuitry in an application-specific integrated circuit (ASIC). Furthermore, the demodulator can be adjusted to accommodate the communication protocols and system clock rates used with a variety of different transmission media and data delivery applications.

These and other advantages and features of the present invention will become more apparent from the accompanying drawings and the following detailed description.

BRIEF DESCRIPTION OF THE DRAWING

FIGS. 1A–1C show exemplary signals in an adjustable frequency shift keyed (FSK) demodulator in accordance with the invention.

FIGS. 3A–3H comprise a timing diagram illustrating the operation of the FSK demodulator of FIG. 2.

FIG. 4 shows an exemplary waveform reshaper suitable for use in the FSK demodulator of FIG. 2.

DETAILED DESCRIPTION OF THE INVENTION

Figure 2:
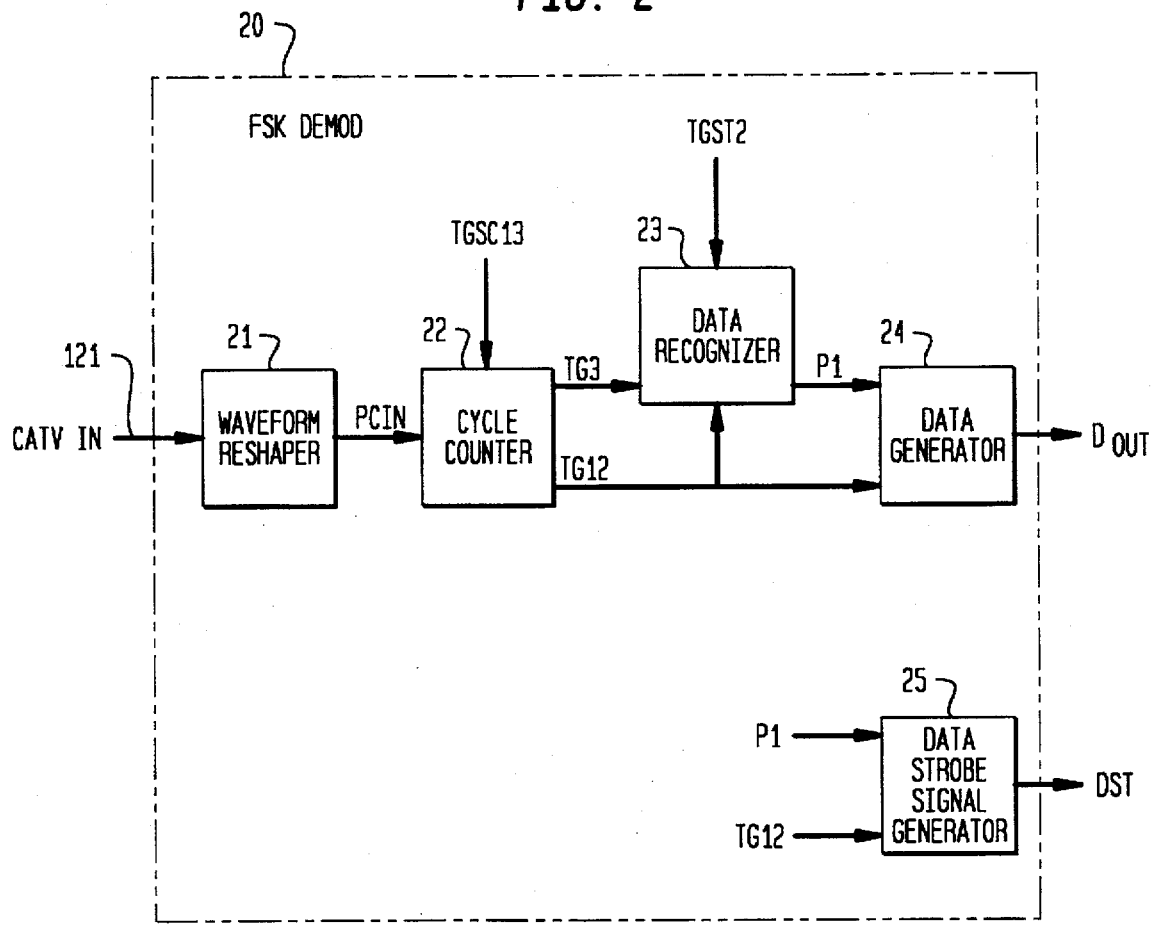
FIG. 2 is a block diagram of an exemplary adjustable FSK demodulator in accordance with the invention.

The present invention will be described below in accordance with an exemplary application in which digital data is provided over a community access television (CATV) system cable by transmitting an frequency-shift keyed (FSK) signal on an exemplary television channel. It should be understood that the invention is more broadly applicable to other communication systems and media. The demodulation techniques of the present invention may thus be utilized in telephone line modems as well as any other application which would benefit from efficient and flexible digital demodulation techniques. Furthermore, exemplary logic circuitry is used to illustrate the operation of the invention. Numerous alternative arrangements of logic circuitry suitable for implementing the invention will be apparent to those skilled in the art. For example, the counter configurations shown could be varied to incorporate any of a number of alternative programmable counters.

FIG. 1A shows a portion of an exemplary FSK signal designated CATVIN suitable for providing a data delivery service over a conventional CATV channel in accordance with the invention. The FSK signal CATVIN may be modulated onto a higher frequency carrier signal for transmission over certain transmission media. The higher frequency carrier signal is then demodulated and/or frequency shifted at a remote user destination receiver to provide the signal CATVIN. CATVIN will therefore be referred to herein as a baseband FSK signal. The baseband FSK signal CATVIN includes an FSK carrier signal at a first frequency $f_0$ which represents binary data at a logic zero level and an FSK carrier signal at a second frequency $f_1$ which represents binary data at a logic one level. The FSK carrier signal frequency transmitted at any given time thus depends upon the binary level of the modulation data at that time. In this example, a single cycle at an $f_0$ of 1.19 MHz represents each binary zero in the modulation data and three cycles at an $f_1$ of 3.58 MHz represent each binary one. The data transmission rate of a CATV data delivery system using the FSK signal defined in FIG. 1A is 1.19 Mbits/sec. The exemplary FSK carrier signals may be transmitted within the frequency bandwidth of a single conventional 6 MHz television video signal channel in which the video signal typically occupies only about 4 MHz. A data delivery system in accordance with one embodiment of the invention can thus utilize existing CATV cable transmission media.

Remote users are equipped with an FSK demodulator conforming to one or more predetermined FSK communication protocols such as that described above and can thereby receive the digital data transmitted from a given source such as a television station. The data transmitted from the source can be a computer program, a video game program, stock information or any other data which it is desirable to transmit over the CATV system to a remote user. The analog FSK signal of FIG. 1A is converted into a digital data signal DOUT as shown in FIG. 1B in the FSK demodulator at the remote user site. DOUT thus corresponds to the recovered modulation data which was applied to an FSK modulator to generate the above-described FSK signal CATVIN. The digital data signal DOUT can be utilized in a digital data processor such as a computer, a video game machine, a television set-top box or the like.

FIG. 2 shows an exemplary adjustable digital FSK demodulator 20 in accordance with one embodiment of the present invention. FIGS. 3A-3H show exemplary signals utilized in the FSK demodulator 20 of FIG. 2. A baseband FSK signal CATVIN shown in triangle-wave form in FIG. 3A is applied via line 121 to a waveform reshaper 21. The CATVIN signal may also be applied to waveform reshaper 21 in the sine-wave format shown in FIG. 1A or in other suitable formats. As noted above, the CATVIN signal may have been demodulated and/or frequency shifted from a higher frequency carrier suitable for transmission over a cable or other transmission medium. A particular CATV video signal channel is selected for demodulation using conventional radio-frequency (RF) tuning techniques in a user receiver (not shown) which includes or is otherwise coupled to the FSK demodulator 20.

The waveform reshaper 21 converts the CATVIN signal of FIG. 3A to a square pulse signal CIN as shown in FIG. 3B and then converts CIN to a pulse signal PCIN as shown in FIG. 3F. The generation of PCIN from CATVIN will be described in detail below in conjunction with FIG. 4. The pulse signal PCIN is applied to a cycle counter 22 which generates pulse signals TG3 and TG12 shown in FIGS. 3G and 3H, respectively. The pulse signal TG3 provides pulses indicating the presence of logic one data in the CIN signal, and pulse signal TG12 provides pulses indicating the presence of logic zero data in the CIN signal. TG3 is applied to a data recognizer 23 which generates a signal P1 to be described in greater detail below in conjunction with FIG. 6. The P1 and TG12 signals are applied to a data generator 24 which uses P1 and TG12 to recover the demodulated data signal DOUT. The FSK demodulator 20 also includes a data strobe signal generator 25 which receives P1 and TG12 and generates therefrom a data strobe signal DST. The signal DST indicates the presence of a stable data bit in the DOUT signal. An exemplary signal DST is shown in FIG. 1C and will be described in greater detail below in conjunction with FIGS. 9 and 10A-10J.

FIG. 4 shows an exemplary waveform reshaper suitable for use in the FSK demodulator 20 of FIG. 2. The FSK signal CATVIN of FIG. 3A is applied via line 121 to a Schmidt trigger circuit 31 which converts CATVIN to the square pulse signal CIN of FIG. 3B on line 131. A D-type flip-flop 32 receives CIN on its data input and a demodulator system clock MCK as shown in FIG. 3C on its clock input via line 136. The flip-flop 32 sychronizes CIN with of MCK to provide on line 132 a synchronized and delayed signal DCIN shown in FIG. 3D. In this embodiment, the signal DCIN is synchronized with the falling edge of the pulses of the system clock MCK. The signal DCIN is then delayed by an additional MCK clock pulse in a second D-type flip-flop 33 to provide on line 133 the signal DDCIN as shown in FIG. 3E. The complement of DDCIN is produced on line 134 as DDCINB. The flip-flops 32, 33 may be reset using a reset signal RD which is generally maintained at a logic low level during a demodulation operation. The signals DCIN and DDCINB are applied to an AND gate 34 which generates on line 135 the signal PCIN shown in FIG. 3F. The signal PCIN includes a pulse for each of the pulses in the signal CIN but each PCIN pulse is only one system clock pulse wide. PCIN thus represents a digitized version of CATVIN and is applied to cycle counter 22 as described previously. The process of digitizing CATVIN in waveform reshaper 21 may introduce distortion in the output signal PCIN. The maximum distortion resulting from the conversion of CIN to DCIN in flip-flop 32 is the duration of one clock pulse in system time clock MCK. Increasing the system clock rate will therefore decrease the resulting distortion. As an example, assume the system clock rate is selected as 21.4772 MHz. Each cycle of the 3.58 MHz FSK frequency $f_1$ will then include 5.999 system clock cycles (21.4772÷3.58=5.999) and each cycle of the 1.19 MHz FSK frequency $f_0$ will include 18.048 system clock cycles (21.4772÷1.19=18.048). If each FSK frequency is to be identified using an integer number of system clock pulse counts, $f_1$ will correspond to 5 or 6 system clock counts and $f_0$ will correspond to 18 or 19 counts. Including the effects of the above-noted maximum one-cycle distortion in the digitization process, $f_1$ will correspond to 4 to 7 counts and $f_0$ will correspond to 17 to 20 counts.

Figure 5A:
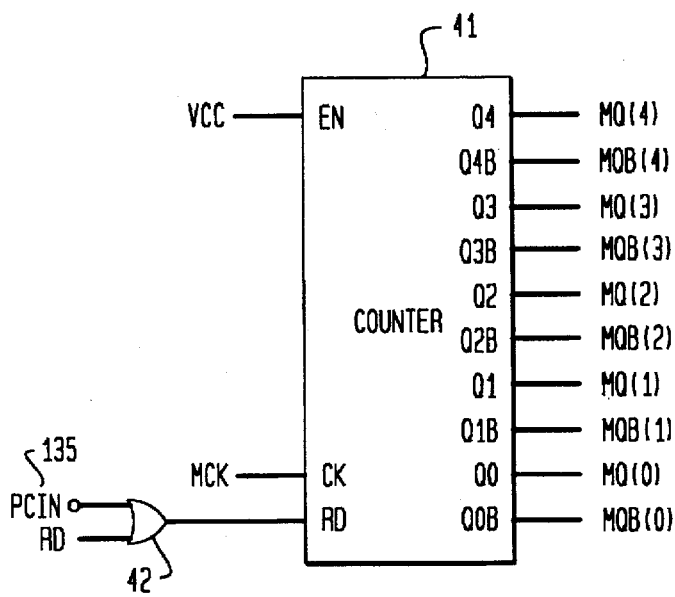
FIGS. 5A and 5B show an exemplary cycle counter suitable for use in the FSK demodulator of FIG. 2.
Figure 5B:
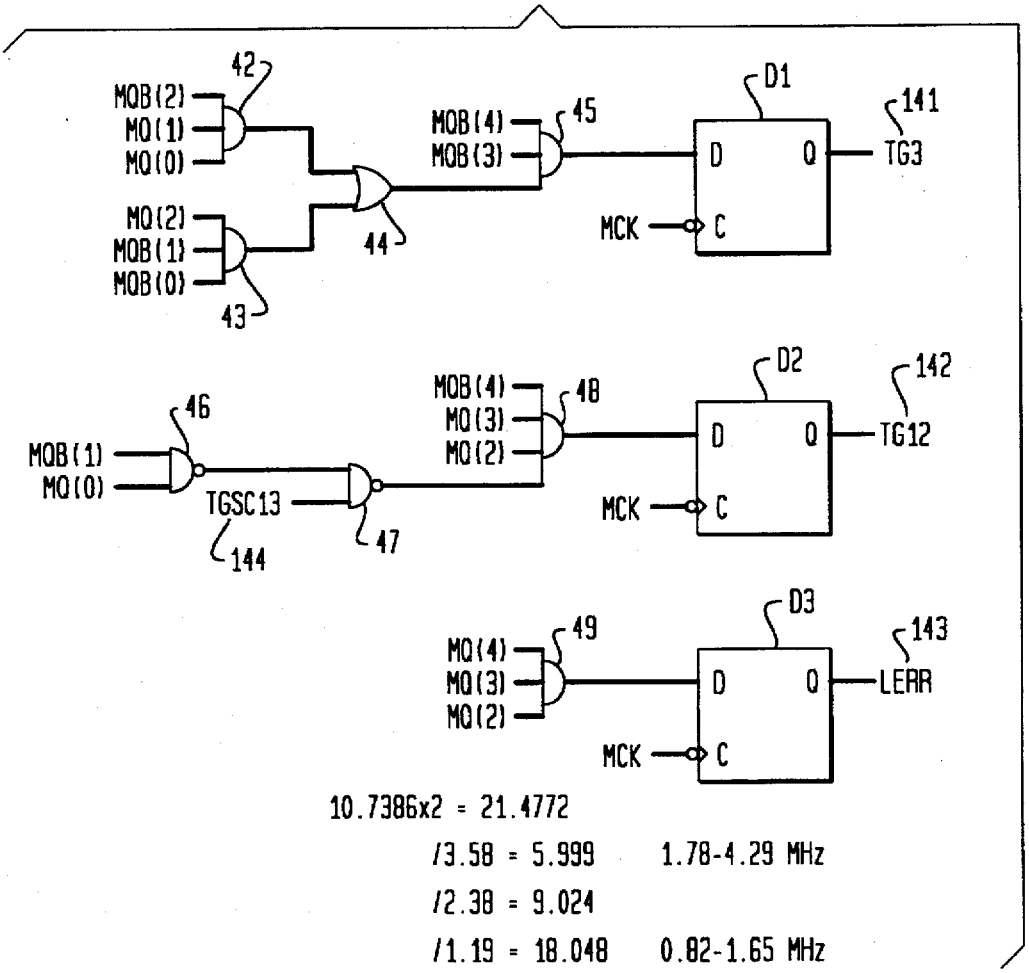

FIGS. 5A and 5B show an exemplary cycle counter 22 suitable for use in the FSK demodulator 20 of FIG. 2. The cycle counter receives PCIN on line 135 from waveform reshaper 21 as one input of an OR gate 42. The other input of OR gate 42 is tied to the above-noted reset signal RD which may be supplied from a system controller (not shown) and is operative to override the signal PCIN and reset the demodulator 20 at selected times such as during a system initialization. As previously noted, the reset signal RD is normally maintained at a logic low level during a demodulation operation.

The output of OR gate 42 is supplied to a reset input of a five-bit counter 41. The counter 41 also receives system clock MCK on its clock input and provides parallel five-bit outputs MQ[1]–MQ[4] and MQB[1]–MQB[4] corresponding to the current count and its complement, respectively. The counter 41 is reset by each pulse of the signal PCIN. When the signal PCIN is at a logic high level, the output of OR gate 42 is also high and the counter 41 is reset. When the signal PCIN is at a logic low level, the output of OR gate 42 is low and the counter 41 counts the number of system clock during the corresponding cycle of the received signal CATVIN. The cycle counter of the present invention provides a synchronization function in that the counter 41 is restarted with each new cycle of the received signal CATVIN. Advantageously, this synchronization feature is provided without the phase lock loop or other complex analog circuitry utilized in prior art FSK demodulators.

The count outputs of counter 41 are supplied to AND gates 42, 43, 45, 48 and 49 and NAND gate 46 of FIG. 5B. The outputs of gates 42 and 43 are provided as inputs to an OR gate 44 and the output of OR gate 44 is supplied to an input of AND gate 45. The output of NAND gate 46 is applied as an input to a NAND gate 47 which receives on another input an adjustment signal TGSC13. The adjustment signal TGSC13 adjusts the number of system clock cycles which must be counted before a TG12 pulse is generated. In this example, TGSC13 is maintained at a logic low level in order for a TG12 pulse to be generated after twelve system clock pulses. As will be described below, alternative FSK communication protocols can be accommodated by suitable adjustment of TGSC13 and other signals. The output of NAND gate 47 is applied as an input to AND gate 48. The outputs of AND gates 45, 48 and 49 are applied to data inputs of delay devices D1, D2, D3, respectively, which in this embodiment are D-type flip-flops. The flip-flops D1, D2 and D3 each receive the system clock MCK on corresponding clock inputs. The output of flip-flop D1 on line 141 is the low number index signal TG3 as shown in FIG. 3G. The output of flip-flop D2 on line 142 is the high number index signal TG12 as shown in FIG. 3H. The low number index signal TG3 includes a pulse for each time the counter 41 reaches a count of three between PCIN pulses. The high number index signal TG12 includes a pulse for each time the counter 41 reaches a count of twelve between PCIN pulses. The flip-flop D3 generates on line 143 an auxiliary error index signal LERR. The signal LERR includes a pulse for each time the counter reaches a count of twenty-eight between PCIN pulses. Numerous alternative configurations of the logic circuitry shown in FIG. 5B may be utilized to identify the presence of a desired cycle count and thereby the presence of a logic high or low data bit in the input FSK signal.

The signals TG3, TG12 and LERR provide indices which may be used to identify the presence of $f_1$ and $f_0$ in the received signal CATVIN. It will again be assumed by way of example that the system time clock MCK is 21.4772 MHz. The absence of a pulse in low number index signal TG3 indicates that counter 41 has not reached a count of three between PCIN pulses and that the corresponding CATVIN frequency is greater than about 4.29 MHz. This situation will generally not arise in a data delivery system in which the video signal bandwidth is limited to 4 MHz. The presence of one or more pulses in the TG3 signal combined with the absence of a pulse in the TG12 signal indicates that the corresponding frequency of input signal CATVIN is in the range between about 1.78 MHz and 4.29 MHz. The presence of a pulse in both signals TG3 and TG12 combined with the absence of a pulse in signal LERR indicates that the corresponding frequency of CATVIN is in the range between about 0.82 MHz and 1.65 MHz. The presence of a pulse in signal LERR indicates that the corresponding frequency of CATVIN is less than about 0.82 MHz. Application of these ranges to the FSK frequencies $f_1$ and $f_0$ described in conjunction with FIG. 1A above will indicate that $f_1$ is present if only TG3 includes a pulse between PCIN pulses and $f_0$ is present if both TG3 and TG12 but not LERR each include a pulse between PCIN pulses. The presence of a pulse in signal LERR between PCIN pulses will indicate a system error.

Figure 6:
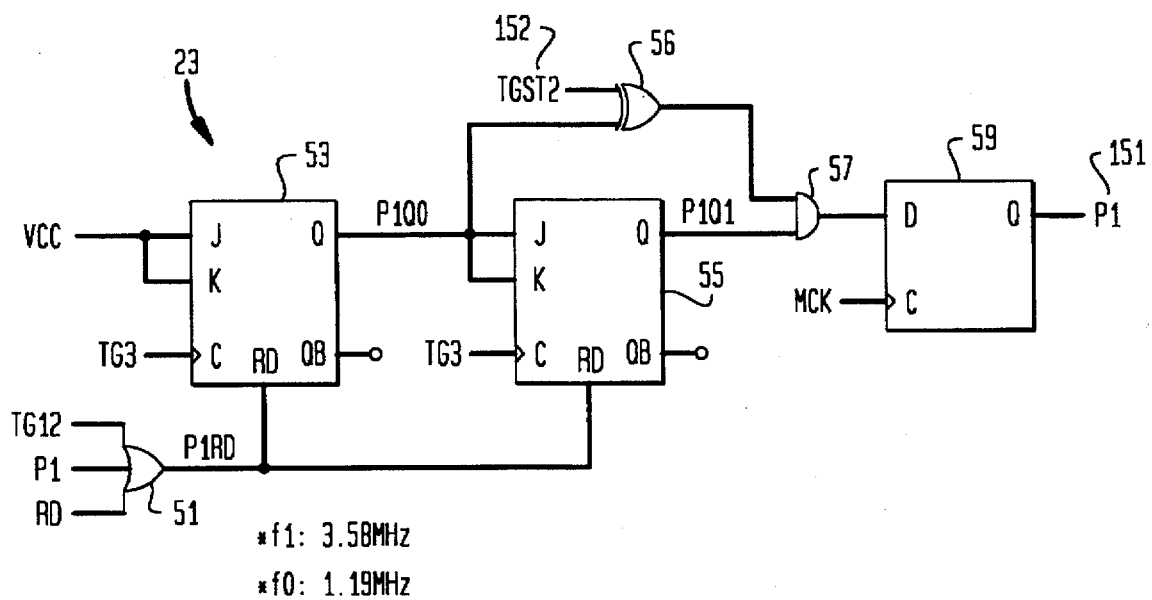
FIG. 6 shows an exemplary data recognizer suitable for use in the FSK demodulator of FIG. 2.

FIG. 6 shows an exemplary data recognizer 23 which uses low number index signal TG3 to determine whether or not input signal CATVIN includes the three continuous cycles at frequency $f_1$ indicative of a logic one data bit. The signals TG12 and RD are input to an OR gate 51 which generates a reset signal P1RD. The OR gate 51 also receives the signal P1 such that the data recognizer is reset with each output P1 pulse generated by the recognizer. The reset signal P1RD is applied to reset inputs of first and second J-K flip-flops 53, 55. The signal TG3 is applied to the clock input of the first and second J-K flip-flops 53, 55. The J and K inputs of flip-flop 53 are both tied to a logic high voltage level VCC. The output of flip-flop 53 is applied to the J and K inputs of the flip-flop 55 and to an input of an XOR gate 56. The other input of XOR gate 56 receives an adjustment signal TGST2 from a system controller (not shown). The adjustment signal TGST2 provides adjustability in the number of pulses of TG3 which are counted before the signal P1 is generated to indicate the presence of a data bit of logic level one in the CATVIN signal. In this example, the signal TGST2 is maintained at a logic low level in order for data recognizer 23 to provide a P1 pulse after three TG3 pulses. The output of flip-flop 55 is applied along with the output of XOR gate 56 to inputs of AND gate 57. The output of AND gate 57 is supplied to the data input of D-type flip-flop 59 which receives MCK on its clock input. The output of flip-flop 59 on line 151 is the signal P1 which is supplied to the data generator 24. Numerous alternative arrangements of logic circuitry may be utilized to provide an adjustment in the number of input signal cycles per logic high or low data bit in accordance with the invention.

Figures 7A, 7B, 7C, 7D:
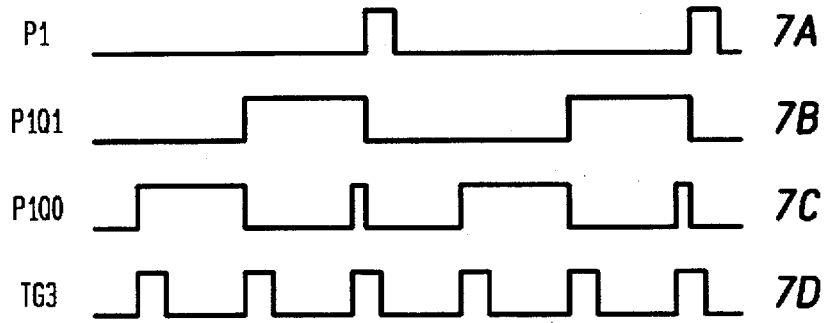
FIGS. 7A-7D comprise a timing diagram illustrating the operation of the data recognizer of FIG. 6.

FIGS. 7A–7C show a timing diagram of signals P1, P1Q0 and P1Q1 which are generated in the data recognizer of FIG. 6. The signal TG3 is shown in FIG. 7D for reference. The signals P1Q0 and P1Q1 are outputs of the flip-flops 53 and 55, respectively.

Figure 8:
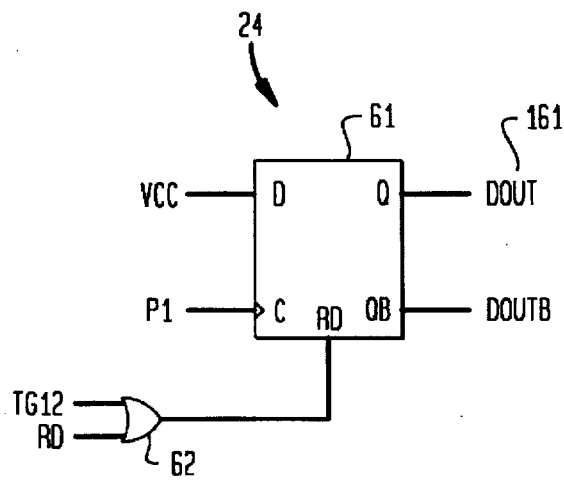
FIG. 8 shows an exemplary data generator suitable for use in the FSK demodulator of FIG. 2.

FIG. 8 shows an exemplary data generator 24 suitable for use in the FSK demodulator 20 of FIG. 2. The data generator 24 in this example includes an OR gate 62 which receives as inputs the TG12 and RD signals described above. The output of OR gate 62 is supplied to the reset input of a D-type flip-flop 61 which has its data input tied to logic high voltage level VCC. The signal P1 from the data recognizer 23 of FIG. 6 is applied to the clock input of flip-flop 61. The output of flip-flop 61 on line 161 is the demodulated data signal DOUT as shown in FIG. 1B. When the signal P1 is at a logic high level, indicating the presence of a logic one data bit in the signal CATVIN, the signal TG12 is low and the signal DOUT is high. When the signal TG12 is high, flip-flop 61 is reset and DOUT is driven low. The demodulated data signal DOUT is thus generated from the signal CATVIN in accordance with the present invention using entirely digital processing techniques.

Figure 9:
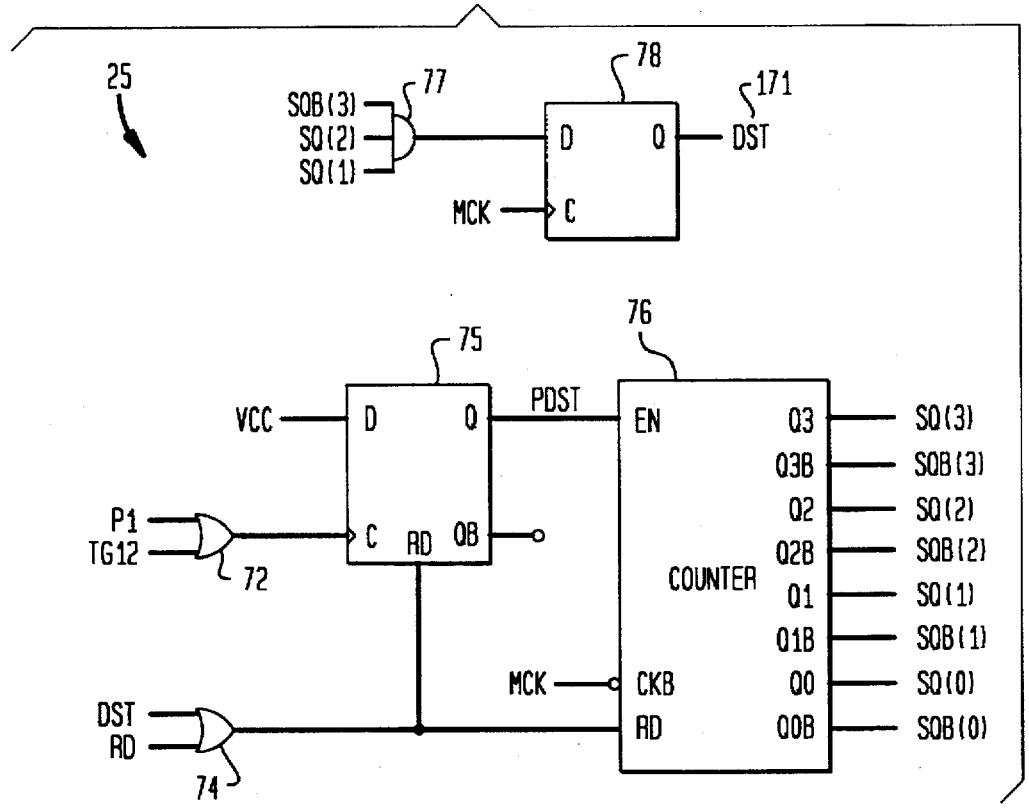
FIG. 9 shows an exemplary data strobe signal generator suitable for use in the FSK demodulator of FIG. 2.
Figures 10A, 10B, 10C, 10D, 10E, 10F, 10G, 10H, 10I, 10J:
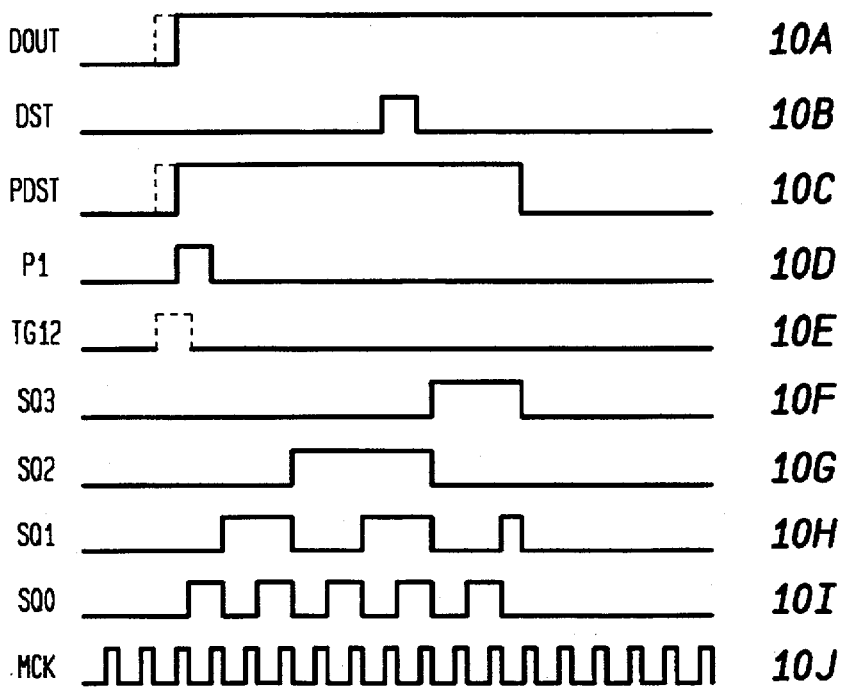
FIGS. 10A-10J comprise a timing diagram illustrating the operation of the data strobe signal generator of FIG. 9.

FIG. 9 shows an exemplary data strobe signal generator 25 suitable for use in the FSK demodulator of FIG. 2. FIGS. 10A–10J comprise a timing diagram showing the relationships between various signals in the strobe signal generator 25. As noted above, the generator 25 provides a data strobe signal DST as shown in FIG. 10B which indicates the presence of a stable data bit in the recovered data signal DOUT shown in FIG. 10A. The data rate of the above-described exemplary system in which $f_1$ is 3.58 MHz and $f_0$ is 1.19 MHz is 1.19 Mb/sec. The recovered data signal DOUT will therefore change from high to low or low to high at most about every 840.336 µs or 18.048 system clock cycles. The presence of a pulse in the P1 or TG12 signal roughly indicates the beginning of a data bit. The time period of 840.336 µs thus corresponds approximately to the time from a given P1 pulse to the next P1 or TG12 pulse or the time from a given TG12 pulse to the next TG12 or P1 pulse. The signal DST is used to indicate a point within the data bit period at which the corresponding data bit can be considered stable and therefore sampled or otherwise read during subsequent processing.

The strobe signal generator 25 includes an input OR gate 72 which receives the previously-described signals P1 and TG12 as shown in FIGS. 10D and 10E. The output of OR gate 72 is applied to the clock input of a D-type flip-flop 75. The output of flip-flop 75 is a signal PDST which is shown in FIG. 10C. The signal PDST is applied to an enable input of a four-bit counter 76 which counts cycles of system time clock MCK shown in FIG. 10J as long as PDST is high. The counter 76 is reset from the output of an OR gate 74 when the DST signal, the RD signal or both are high. The counter 76 generates parallel output signals SQ[0]–SQ[3] and SQB[0]–SQB[3] corresponding to the four-bit count and its complement, respectively. Counter output signals SQ0— SQ3 are shown in FIGS. 10F–10J, respectively. The signals SQ[1], SQ[2], and SQB[3] are applied as inputs to an AND gate 77. The output of AND gate 77 will go high when the count of system clock cycles reaches six and will remain high until the count reaches eight. The output of AND gate 77 is applied to the data input of a D-type flip-flop 78 which receives the system clock signal MCK on its clock input. The output of flip-flop 78 on line 171 is the data strobe signal DST of FIG. 10B.

An important feature of the FSK demodulator of the present invention is that the demodulator may be readily adjusted to operate with different FSK communication protocols. The same demodulator may therefore be used to recognize FSK signalling frequencies other than $f_1$=3.58 MHz and $f_0$=1.19 MHz. For example, assume that the communication protocol is changed such that two continuous sine waves at $f_1$=2.38 MHz represent a logic one data bit and one sine wave at $f_0$=1.19 MHz represents a logic zero data bit. This change can be accommodated by adjusting the values of the TGSC13 signal in FIG. 5B and the TGST2 signal in FIG. 6 from a logic low level used with the previous protocol to a logic high level. More generally, a suitable adjustment to the digital circuitry can be provided by changing the value of a comparator signal in the cycle counter 22 and the value of a programmable counter signal in the data recognizer 23. The cycle counter 22 will then count a reduced number of MCK cycles before the signal TG12 is generated, and the data recognizer 23 will generate signal P1 after only two cycles of TG3 pulses. Numerous alternative hardware and/or software configurations for providing a suitable adjustment in the digital recognition circuitry of FSK demodulator 20 will be readily apparent to those skilled in the art.

Another important feature of the FSK demodulator of the present invention is that when the system time clock value changes, the frequency identification high and low number indices for $f_1$ and $f_0$ change automatically. For example, assume that a cable or other transmission medium is found to be unreliable at certain frequencies and that it is therefore desirable to decrease the transmission rate in order to increase reliability. Assume then that frequency $f_1$ is changed to 1.79 MHz and frequency $f_0$ to 595 kHz such that $f_1$ remains in a 3:1 ratio relative to $f_0$ as in the protocol defined in FIG. 1A above. This change can be readily accommodated in the adjustable FSK demodulator of the present invention by simply changing the system time clock to 10.7386 MHz (21.4772÷2). Similarly, if it is desirable to increase the transmission rate for any reason, one need only increase the frequency of the system time clock. Adjustments to accommodate changes in transmission rate can thus be provided without any alteration of the demodulator hardware.

An all-digital adjustable FSK demodulator in accordance with the present invention provides numerous advantages over conventional analog FSK demodulators. The digital design provides simplified circuitry, highly reliable performance and easy integration with other circuitry in an application-specific integrated circuit (ASIC). Furthermore, the demodulator can be readily adjusted to accommodate the communication protocols used with a variety of different transmission media and data delivery applications.

The above-described embodiments of the invention are intended as illustrative only. Numerous alternative embodiments may be devised by those skilled in the art without departing from the scope of the following claims.

I claim:

1. A demodulator which receives a frequency-shift keyed (FSK) signal on a demodulator input and generates a data signal therefrom, the demodulator comprising:

a waveform reshaper coupled to the demodulator input and receiving the FSK signal therefrom, the reshaper having an output corresponding to a first pulse signal including a pulse for each cycle of the input FSK signal;

a cycle counter coupled to the waveform reshaper and receiving the first pulse signal therefrom, the counter having outputs corresponding to a second pulse signal and a third pulse signal, the second pulse signal including a pulse for each time a first clock pulse count is reached between pulses of the first pulse signal, the third pulse signal including a pulse for each time a second clock pulse count is reached between pulses of the first pulse signal;

a data recognizer coupled to the cycle counter and receiving the second pulse signal therefrom, the recognizer having an output corresponding to a logic level indicator signal indicating the presence of a particular logic level in the FSK input signal based on a count of pulses of the second pulse signal; and a data generator coupled to the cycle counter and data recognizer and receiving therefrom the third pulse signal and the logic level indicator signal, respectively, the data generator having an output corresponding to the data signal.

2. The demodulator of claim 1 wherein the pulses of the first pulse signal have a pulsewidth corresponding to a system time clock period.

3. The demodulator of claim 1 wherein the pulses of the second and third pulse signals have a pulsewidth corresponding to a system time clock period.

4. The demodulator of claim 1 wherein the first and second clock pulse counts are based on counts of system clock pulses.

5. The demodulator of claim 1 wherein the first clock pulse count corresponds to a cycle of an FSK carrier signal at a first frequency.

6. The demodulator of claim 1 wherein the second clock pulse count corresponds to a cycle of an FSK carrier signal at a second frequency.

7. The demodulator of claim 1 wherein the cycle counter further includes an adjustment signal input connected to receive a first adjustment signal operative to adjust at least one of the first pulse count or the second pulse count.

8. The demodulator of claim 1 wherein the data recognizer further includes an adjustment signal input connected to receive a second adjustment signal operative to adjust the number of second pulse signal pulses required to indicate a logic level in the FSK input signal.

9. The demodulator of claim 1 further including a data strobe signal generator coupled to the data recognizer output and the third pulse signal output of the cycle counter, the data strobe signal generator having an output corresponding to a data strobe signal indicative of a time after a transition in the data signal at which the data signal can be sampled.

10. A method of demodulating a frequency-shift keyed (FSK) signal to provide a data signal, the method comprising the steps of:

generating from the FSK signal a first pulse signal including a pulse for each cycle of the FSK signal;

generating from the first pulse signal a second pulse signal and a third pulse signal, the second pulse signal including a pulse for each time a first clock pulse count is reached between pulses of the first pulse signal, the third pulse signal including a pulse for each time a second clock pulse count is reached between pulses of the first pulse signal;

generating from the second pulse signal a logic level indicator signal indicating the presence of a particular logic level in the FSK input signal based on a count of pulses of the second pulse signal; and generating the data signal from the third pulse signal and the logic level indicator signal.

11. The method of claim 10 wherein the pulses of the first pulse signal have a pulsewidth corresponding to a system time clock period.

12. The method of claim 10 wherein the pulses of the second and third pulse signals have a pulsewidth corresponding to a system time clock period.

13. The method of claim 10 wherein the first and second clock pulse counts are based on counts of system clock pulses.

14. The method of claim 10 wherein the first clock pulse count corresponds to a cycle of an FSK carrier signal at a first frequency.

15. The method of claim 10 wherein the second clock pulse count corresponds to a cycle of an FSK carrier signal at a second frequency.

16. The method of claim 10 further including the step of adjusting at least one of the first pulse count or the second pulse count.

17. The method of claim 10 further including the step of adjusting the number of second pulse signal pulses required to indicate a logic level in the FSK input signal.

18. The method of claim 10 further including the step of generating from the third pulse signal and the logic level indicator signal a data sampling signal indicative of a time after a transition in the data signal at which the data signal can be sampled.

* * * * *